United States Patent
Norkin

(10) Patent No.: US 12,192,533 B2
(45) Date of Patent: Jan. 7, 2025

(54) GENERALIZED VIDEO DEBLOCKING FILTER

(71) Applicant: NETFLIX, INC., Los Gatos, CA (US)

(72) Inventor: Andrey Norkin, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 137 days.

(21) Appl. No.: 18/166,430

(22) Filed: Feb. 8, 2023

(65) Prior Publication Data

US 2023/0254516 A1     Aug. 10, 2023

Related U.S. Application Data

(60) Provisional application No. 63/308,443, filed on Feb. 9, 2022.

(51) Int. Cl.
| | |
|---|---|
| *H04N 19/86* | (2014.01) |
| *H04N 19/117* | (2014.01) |
| *H04N 19/124* | (2014.01) |
| *H04N 19/132* | (2014.01) |
| *H04N 19/176* | (2014.01) |
| *H04N 19/186* | (2014.01) |
| *H04N 19/80* | (2014.01) |

(52) U.S. Cl.
CPC .......... *H04N 19/86* (2014.11); *H04N 19/117* (2014.11); *H04N 19/124* (2014.11); *H04N 19/132* (2014.11); *H04N 19/176* (2014.11); *H04N 19/186* (2014.11); *H04N 19/80* (2014.11)

(58) Field of Classification Search
CPC .... H04N 19/86; H04N 19/117; H04N 19/124; H04N 19/132; H04N 19/176; H04N 19/186; H04N 19/80; H04N 19/14; H04N 19/82
USPC ...................................................... 375/240.3
See application file for complete search history.

(56) References Cited

U.S. PATENT DOCUMENTS

2022/0312005 A1* 9/2022 Lim ........................ H04N 19/12
2022/0417507 A1* 12/2022 Oh .......................... H04N 19/61

OTHER PUBLICATIONS

Han et al., "A Technical Overview of AV1", arXiv:2008.06091v2 [eess.IV] Feb. 8, 2021, 25 pages.

\* cited by examiner

*Primary Examiner* — Tung T Vo
(74) *Attorney, Agent, or Firm* — Artegis Law Group, LLP

(57) ABSTRACT

One embodiment of the present invention sets forth a technique for deblocking video frames. The technique includes determining a filter length associated with a boundary between a first block and a second block included in the same video frame. The technique also includes computing a parameter value that minimizes a sum of squares of second derivatives associated with samples from the first block and second block that are adjacent to the boundary. The technique further includes determining a plurality of filter values based on the parameter value and the filter length, and applying a filter having the filter length and the filter values to additional samples within the first and second blocks to generate two filtered blocks corresponding to the first and second blocks. The technique additionally comprises generating a second video frame that includes the two filtered blocks.

20 Claims, 4 Drawing Sheets

GENERALIZED VIDEO DEBLOCKING FILTER

CROSS-REFERENCE TO RELATED APPLICATIONS

This application claims the benefit of U.S. Provisional Application titled "DEBLOCKING FILTER FOR AVM," filed on Feb. 9, 2022, and having Ser. No. 63/308,443. The subject matter of this application is hereby incorporated herein by reference in its entirety.

BACKGROUND

Field of the Various Embodiments

Embodiments of the present disclosure relate generally to computer science and video processing and, more specifically, to a generalized video deblocking filter.

Description of the Related Art

Video content from a media title is commonly encoded to reduce the size of the video content and to convert the content into a format that is suitable for broadcast, transmission or playback on various devices or platforms. For example, video content from a movie or television show could be encoded into multiple versions that can be streamed to endpoint devices. Each version of the video content could be associated with a certain encoding format, bit rate, frame rate, resolution, level of quantization, or other encoding settings that are optimized for streaming or playback on a particular set of hardware and/or under a given set of network conditions.

During encoding of video content from a media title, each video frame is divided into multiple blocks of fixed or varying sizes, and the portion of video content within each block is independently encoded. During playback of the media title, the encoded blocks can be decoded independently and used to reconstruct the video frame. However, the block-based structure of encoded video can result in sharp or noticeable edges along the boundaries between adjacent blocks within a given decoded video frame. These edges are typically more pronounced when the video content is encoded at lower bit rates because lower bit rates are generally associated with higher levels of compression, higher distortion, and lower overall visual quality. In other words, because encoding video content at lower bit rates causes each block to be approximated more coarsely, the differences between neighboring blocks in encoded video content become more visible as bit rates with which the video content is encoded decrease.

To mitigate the block-based edge artifacts described above, a deblocking filter can be incorporated into one or more stages of an encoding path and/or decoding path for a given media title or other video. The deblocking filter typically acts as a low-pass filter that removes high-frequency detail from pixels on both sides of a boundary between adjacent blocks within the same video frame, thereby smoothing the sharp edge between the blocks.

However, existing deblocking filters can adversely impact the visual quality of videos in a variety of ways. In particular, conventional deblocking filters can fail to remove some block-based edge artifacts from videos, particularly when a given video is encoded using higher levels of compression. In other situations, deblocking filters can be applied too aggressively to the pixels on both sides of a boundary between adjacent blocks, which can result in an over-smoothed video that lacks some of the relevant high-frequency details that are present in the original uncompressed video.

Existing deblocking filters also are oftentimes implemented in complex and inefficient ways. For example, a conventional video codec could use up to 40-50 functions to implement deblocking filters for various combinations of filter lengths, color space components, or other types of deblocking filtering conditions. Because each function incurs a certain amount of processor, memory, storage, or other resource overhead, deblocking filtering operations can contribute to a significant portion of the computational complexity and resource consumption associated with block-based encoding and decoding of videos.

As the foregoing illustrates, what is needed in the art are more effective deblocking filters and filtering techniques for videos.

SUMMARY

One embodiment of the present invention sets forth a technique for deblocking video frames. The technique includes determining a filter length associated with a boundary between a first block and a second block included in the same video frame. The technique also includes computing a parameter value that minimizes a sum of squares of second derivatives associated with samples from the first block and second block that are adjacent to the boundary. The technique further includes determining a plurality of filter values based on the parameter value and the filter length, and applying a filter having the filter length and the filter values to additional samples within the first and second blocks to generate two filtered blocks corresponding to the first and second blocks. The technique additionally comprises generating a second video frame that includes the two filtered blocks.

One technical advantage of the disclosed techniques relative to the prior art is that, with the disclosed techniques, edge artifacts along the boundaries between adjacent blocks within an encoded video frame can be removed in a way that preserves relevant high-frequency details near those boundaries. Consequently, the disclosed techniques can improve the visual quality of decompressed videos relative to what can be achieved using conventional filtering approaches that are unable to remove noticeable edge artifacts around block boundaries or that tend to over-smooth and remove relevant high-frequency details from video content near block boundaries. Another technical advantage of the disclosed techniques is the use of a small number of functions to compute the deblocking filters associated with various combinations of filter lengths, color space components, or other deblocking filtering conditions. Accordingly, the disclosed techniques are more resource-efficient than existing codecs that use dozens of functions to implement deblocking filters for the different combinations of deblocking filtering conditions. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
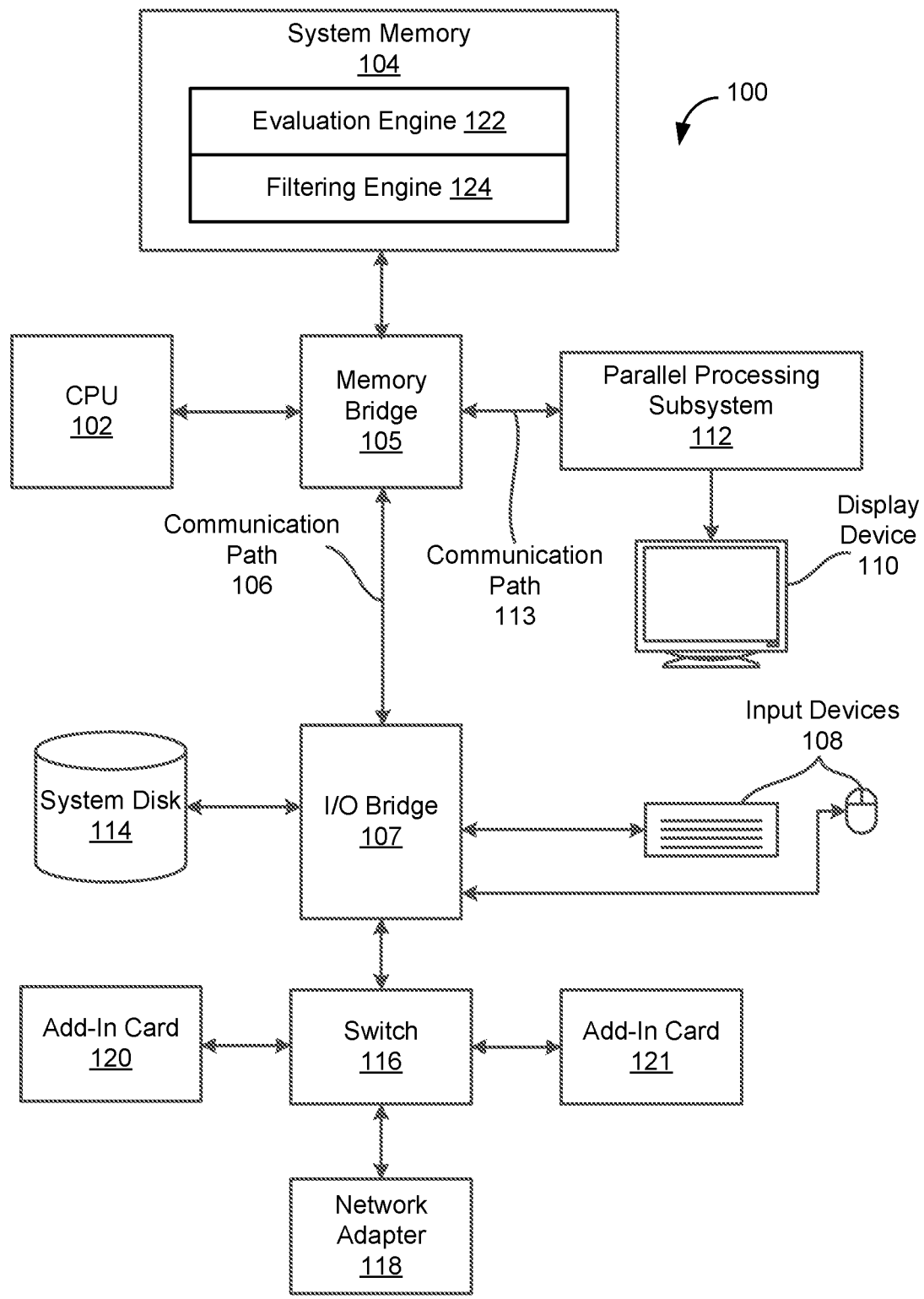
FIG. 1 illustrates a computer system configured to implement one or more aspects of various embodiments.

In the following description, numerous specific details are set forth to provide a more thorough understanding of the various embodiments. However, it will be apparent to one of skill in the art that the inventive concepts may be practiced without one or more of these specific details.

Media titles and/or other types of video are commonly encoded by dividing video content within individual video frames into blocks of fixed or varying sizes and independently encoding the video content in each block. During playback of a media title, the blocks can be decoded independently and used to reconstruct the corresponding video frames. However, the block-based structure of encoded video can result in sharp or noticeable edges along block boundaries between adjacent blocks within a given decoded video frame. These edges are more pronounced when the video is encoded at lower bit rates because lower bit rates are generally associated with higher levels of compression, higher distortion, and lower visual quality. In other words, because encoding video content at lower bit rates causes each block to be approximated more coarsely, the differences between neighboring blocks in encoded video content become more visible as bit rates with which the video content is encoded decrease.

To mitigate these block-based edge artifacts, a deblocking filter can be incorporated into one or more stages of an encoding path and/or decoding path for a video. The deblocking filter typically acts as a low-pass filter that removes high-frequency detail from pixels on both sides of the block boundary between adjacent blocks within the same video frame, thereby smoothing the sharp edge between the blocks.

However, existing deblocking filters can adversely impact the visual quality of a video in a variety of ways. More specifically, a conventional deblocking filter can fail to remove all block-based edge artifacts from a video, particularly when the video is encoded using a higher level of compression. In other situations, deblocking filters can be applied too aggressively, resulting in over-smoothed video that lacks high-frequency details that are present in the original uncompressed video.

Existing deblocking filters are also implemented in a complex and inefficient manner. For example, a conventional video codec could use up to 40-50 functions to implement deblocking filters for various combinations of filter lengths, color space components, or other types of deblocking filtering conditions. Because each function incurs a certain amount of processor, memory, storage, or other resource overhead, deblocking filtering operations can contribute to a significant portion of the computational complexity and resource consumption associated with block-based encoding and decoding of video.

To improve visual quality and reduce resource overhead associated with block-based encoding and decoding of video, the disclosed techniques use a generalized deblocking filter to remove sharp edges and other artifacts along block boundaries between adjacent blocks of encoded video frames. The generalized deblocking filter uses a small number of functions to perform deblocking filtering for any combination of filter length, color space component, or another type of deblocking filtering condition that affects the manner in which deblocking filtering operations are performed.

The filter length corresponds to the number of samples that can be modified by a deblocking filter. This filter length is computed for a given block or line of pixels that crosses a block boundary between two adjacent blocks by evaluating various conditions associated with different filter lengths, starting from a lowest (or highest) filter length and progressing to increasingly higher (or lower) filter lengths. Each condition specifies a threshold associated with a set of "samples" (e.g., chroma, luma, or other pixel values) from positions on both sides of the boundary and/or a set of derivatives (e.g., first derivatives, second derivatives, etc.) computed from the samples. When a set of conditions associated with a given filter length is met by the corresponding samples or derivatives, the process is repeated using another set of conditions associated with the next highest (or lowest) filter length. Thus, the filter length can be determined as the highest (or lowest) filter length for which all conditions are met, up to a maximum (or minimum) filter length associated with the generalized deblocking filter.

After the filter length is determined for a block or line of pixels that crosses a given block boundary, samples from both sides of the block boundary are used to derive a "delta" parameter value that minimizes the sum of squares of second derivatives of the samples adjacent to the block boundary. The deblocking filter is then applied as different proportions of the delta parameter to different sample positions spanned by the filter length, with the proportion of the delta parameter applied to a given sample position computed to be inversely proportional to the distance between the sample position and the block boundary. Thus, by minimizing the sum of squares of second derivatives of samples adjacent to the block boundary, the deblocking filter smooths the sample values across the block boundary.

One technical advantage of the disclosed techniques relative to the prior art is that, with the disclosed techniques, edge artifacts along the boundaries between adjacent blocks within an encoded video frame can be removed in a way that preserves relevant high-frequency details near those boundaries. Consequently, the disclosed techniques can improve the visual quality of decompressed videos relative to what can be achieved using conventional filtering approaches that are unable to remove noticeable edge artifacts around block boundaries or that tend to over-smooth and remove relevant high-frequency details from video content near block boundaries. Another technical advantage of the disclosed techniques is the use of a small number of functions to compute the deblocking filters associated with various combinations of filter lengths, color space components, or other deblocking filtering conditions. Accordingly, the disclosed techniques are more resource-efficient than existing codecs that use dozens of functions to implement deblocking filters for the different combinations of deblocking filtering conditions. These technical advantages provide one or more technological improvements over prior art approaches.

System Overview

FIG. 1 is a block diagram illustrating a computer system 100 configured to implement one or more aspects of various embodiments. In some embodiments, computer system 100 is a machine or processing node operating in a data center, cluster, or cloud computing environment that provides scalable computing resources (optionally as a service) over a network.

As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIG. 2, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

Parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality of the system can be distributed across multiple nodes of a distributed and/or cloud computing system. Second, the connection topology, including the number and arrangement of bridges, the number of CPUs 102, and the number of parallel processing subsystems 112, can be modified as desired. For example, in some embodiments, system memory 104 could be connected to CPU 102 directly rather than through memory bridge 105, and other devices would communicate with system memory 104 via memory bridge 105 and CPU 102. In another example, parallel processing subsystem 112 may be connected to I/O bridge 107 or directly to CPU 102, rather than to memory bridge 105. In a third example, I/O bridge 107 and memory bridge 105 may be integrated into a single chip instead of existing as one or more discrete devices. Third, one or more components shown in FIG. 1 may not be present. For example, switch 116 could be eliminated, and network adapter 118 and add-in cards 120, 121 would connect directly to I/O bridge 107.

In one or more embodiments, computer system 100 is configured to execute an evaluation engine 122 and a filtering engine 124 that reside in system memory 104. Evaluation engine 122 and filtering engine 124 may be stored in system disk 114 and/or other storage and loaded into system memory 104 when executed.

In some embodiments, evaluation engine 122 analyzes a media title and/or other video content to determine whether or not to perform deblocking filtering on block boundaries between adjacent blocks in the video content. For each block boundary to which deblocking filtering is to be applied, filtering engine 124 determines a filter length associated with one or more lines or blocks of pixels that cross the block boundary based on samples (e.g., pixel values) from the pixels and/or derivatives associated with the samples. Filtering engine 124 also uses a formula for a generalized deblocking filter to compute filter values associated with the filter length. Filtering engine 124 then applies the filter values to the corresponding samples to remove edge artifacts along the block boundary. As described in further detail below, the generalized deblocking filter is capable of removing the edge along the boundary while preserving high frequency details near the boundary and allowing for a smooth transition between signals on both sides of the boundary. At the same time, the generalized deblocking filter allows a small number of formulas to be used to compute deblocking filters for various combinations of filter lengths, color space components, or other conditions that affect deblocking filtering operations.

The deblocking filter described herein can be used as a post-processing filter or an in-loop filter. When implemented as a post-processing filter, the deblocking filter can be applied to output frames of a video decoder (e.g., within a decoder module or in a display processing chain). When implemented as an in-loop filter, the deblocking filter can be applied by a decoder or encoder to decoded frames before the decoded frames are stored in buffers of the decoder or encoder for subsequent use in motion prediction, motion compensation, or output to a display. The in-loop filter thus improves the quality of the output video and the quality of reference frames used to encode other video frames, thereby further improving compression efficiency associated with encoding the video frames.

Generalized Video Deblocking Filter

Figure 2:
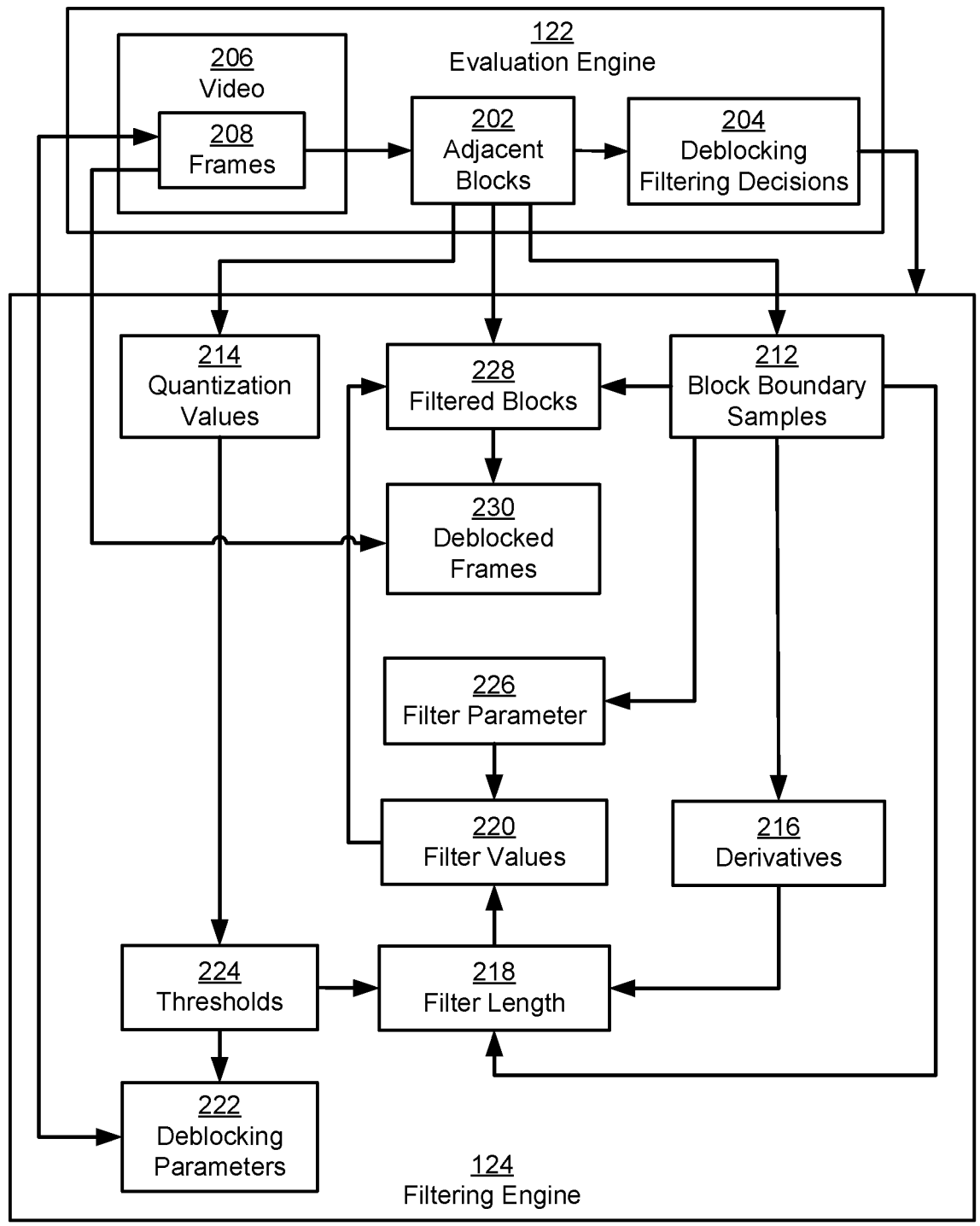
FIG. 2 is a more detailed illustration of the evaluation engine and filtering engine of FIG. 1, according to various embodiments.

FIG. 2 is a more detailed illustration of evaluation engine 122 and filtering engine 124 of FIG. 1, according to various embodiments. As shown in FIG. 2, evaluation engine 122 generates deblocking filtering decisions 204 associated with various portions of encoded video 206. Deblocking filtering decisions 204 indicate whether or not deblocking filtering operations should be applied to individual frames 208 of video 206, block boundaries between adjacent blocks 202 (e.g., pairs of blocks that are stacked top-to-bottom or arranged side-to-side) within each frame of video 206, and/or other portions of content within the encoded video 206.

In some embodiments, evaluation engine 122 generates deblocking filtering decisions 204 based on data or metadata associated with adjacent blocks 202 and/or frames 208 within encoded video 206. For example, evaluation engine 122 could generate one or more deblocking filtering decisions 204 indicating that deblocking filtering should be performed for a block boundary between two adjacent blocks 202 within a frame of encoded video 206 when transform coefficients are present in one or both blocks and/or the block boundary corresponds to a prediction block boundary. In another example, evaluation engine 122 could generate one or more deblocking filtering decisions 204 indicating that deblocking filtering should not be performed for a block boundary when the corresponding adjacent blocks 202 do not have a prediction error and/or the difference in motion vectors between the corresponding adjacent blocks 202 is smaller than a threshold. In a third example, evaluation engine 122 could generate deblocking filtering decisions 204 based on quantization values 214, bit rates, levels of compression, or other attributes associated with individual frames 208, blocks, and/or block boundaries within encoded video 206.

After evaluation engine 122 generates one or more deblocking filtering decisions 204 for a block boundary between two adjacent blocks 202, evaluation engine 122 communicates these deblocking filtering decisions 204 to filtering engine 124. For example, evaluation engine 122 could execute within an encoder and/or decoder for video 206 and specify values of deblocking filtering decisions 204 in deblocking parameters 222 that are stored as metadata for the encoded video 206. One or more portions of filtering engine 122 could execute within the same encoder and/or decoder and retrieve deblocking filtering decisions 204 from the metadata. In another example, evaluation engine 122 could transmit or otherwise provide deblocking filtering decisions 204 to a downstream filtering engine 124 executing within the same encoder and/or decoder.

When deblocking filtering decisions 204 indicate that deblocking filtering is to be performed for a given block boundary in video 206, filtering engine 124 performs deblocking filtering operations that convert these adjacent blocks 202 into filtered blocks 228 that lack sharp or noticeable edges along the block boundary. As shown in FIG. 2, filtering engine 124 determines a filter length 218 for a deblocking filter to be applied to one or more lines of pixels that cross the block boundary. For example, filtering engine 124 could determine a separate filter length 218 for each line of pixels that crosses the block boundary, a rectangular block that includes X adjacent lines of pixels that cross the block boundary, all lines of pixels that cross the block boundary, and/or another set of pixels that crosses the block boundary.

More specifically, each filter length 218 represents the number of samples on one or both sides of a given block boundary that can be modified by the deblocking filter. For example, a symmetric deblocking filter could span N samples on both sides of the block boundary and have a corresponding total filter length 218 of 2 N. In another example, an asymmetric deblocking filter could span M samples on one side of the block boundary (e.g., the left side of a vertical boundary or the top side of a horizontal boundary) and N samples on the other side of block he boundary (e.g., the right side of a vertical boundary or the bottom side of a horizontal boundary) and have a total filter length 218 of M+N.

In one or more embodiments, filtering engine 124 determines filter length 218 for a given set of pixels along a block boundary by comparing block boundary samples 212 from the set of pixels and/or derivatives 216 computed from block boundary samples 212 with one or more corresponding thresholds 224. Block boundary samples 212 can include (but are not limited to) samples of luma color space components, chroma color space components, and/or other types of pixel values from the set of pixels.

An example set of block boundary samples 212 associated with a vertical block boundary between two adjacent blocks 202 can be denoted by the following:

$$s[-7]_0\ s[-6]_0\ s[-5]_0\ s[-4]_0\ s[-3]_0\ s[-2]_0\ s[-1]_0\quad s[0]_0\ s[1]_0\ s[2]_0\ s[3]_0\ s[4]_0\ s[5]_0\ s[6]_0$$
$$s[-7]_1\ s[-6]_1\ s[-5]_1\ s[-4]_1\ s[-3]_1\ s[-2]_1\ s[-1]_1\quad s[0]_1\ s[1]_1\ s[2]_1\ s[3]_1\ s[4]_1\ s[5]_1\ s[6]_1$$
$$s[-7]_2\ s[-6]_2\ s[-5]_2\ s[-4]_2\ s[-3]_2\ s[-2]_2\ s[-1]_2\quad s[0]_2\ s[1]_2\ s[2]_2\ s[3]_2\ s[4]_2\ s[5]_2\ s[6]_2$$
$$s[-7]_3\ s[-6]_3\ s[-5]_3\ s[-4]_3\ s[-3]_3\ s[-2]_3\ s[-1]_3\quad s[0]_3\ s[1]_3\ s[2]_3\ s[3]_3\ s[4]_3\ s[5]_3\ s[6]_3$$

In the above representation, each block boundary sample is represented by $s[i]_j$, where i represents the position of the block boundary sample within a given horizontal line that crosses the boundary and j represents a vertical position of the horizontal line within the set of block boundary samples 212. Block boundary samples 212 from the block to the left of the block boundary have horizontal positions that are denoted by negative numbers, and block boundary samples 212 from the block to the right of the block boundary have horizontal positions that are denoted by non-negative numbers. In this example, filter length 218 can be determined from block boundary samples 212 in lines 0 and 3 (i.e., the two outermost horizontal lines that cross the boundary), one or more other lines that cross the block boundary, and/or all four lines that cross the block boundary.

The same notation can be used to identify block boundary samples 212 associated with a horizontal block boundary between two adjacent blocks 202. Thus, a block boundary sample represented by $s[i]_j$ indicates that the block boundary sample occupies the ith position within a given vertical line that crosses the boundary and the vertical line is in the jth horizontal position within the set of block boundary samples 212.

Derivatives 216 include values associated with changes across a given set of block boundary samples 212. Continuing with the above example, derivatives 216 could include a first derivative for each block boundary sample that is computed using the following:

$$d1[i]_j = s[i+1]_j - s[i]_j \quad (1)$$

In the above equation, $d1[i]_j$ represents the first derivative for the block boundary sample indexed by i and j. The first derivative is computed as the difference between the block boundary sample and another block boundary sample immediately to the right of the block boundary sample.

Derivatives 216 could also, or instead, include a second derivative that is computed using the following:

$$d2\_sig[i]_j = d1[i]_j - d1[i-1]_j \quad (2)$$

In the above equation, $d2\_sig[i]_j$ represents the second derivative for the block boundary sample indexed by i and j. The second derivative is computed as the difference between the first derivative of the block boundary sample and another first derivative of another block boundary sample immediately to the left of the block boundary sample.

Derivatives 216 could also, or instead, include an absolute value of the second derivative that is computed using the following:

$$d2[i]_j = \text{abs}(d1[i]_j - d1[i-1]_j) \quad (3)$$

In the above equation, $d2[i]_j$ represents the absolute value of the second derivative for the block boundary sample indexed by i and j. More specifically, $d2[i]_j$ is computed as the absolute value of the difference between the first derivative of the block boundary sample and another first derivative of another block boundary sample immediately to the left of the block boundary sample.

In some embodiments, each potential filter length 218 for the deblocking filter is associated with a different set of thresholds 224 for one or more block boundary samples 212, one or more derivatives 216 computed from block boundary samples 212 (including derivatives 216 computed using any of Equations 1-3), and/or one or more aggregations of block boundary samples 212 or derivatives 216. To determine a particular filter length 218 for a set of pixels along a block boundary between two adjacent blocks 202, filtering engine 124 determines a set of thresholds 224 for a certain "starting" filter length 218 value, such as a minimum filter length 218 or a maximum filter length 218 associated with the set of pixels. Filtering engine 124 compares this set of thresholds 224 to block boundary samples 212, derivatives 216, and/or aggregations of block boundary samples 212 or derivatives 216 associated with the set of pixels. If all thresholds 224 associated with that filter length 218 are met, filtering engine 124 repeats the process with the next highest or lowest filter length 218 value. Filtering engine 124 continues evaluating block boundary samples 212, derivatives 216, and/or aggregations of block boundary samples 212 or derivatives 216 with respect to corresponding thresholds 224 for increasing (or decreasing) filter length 218 values until the maximum (or minimum) filter length 218 for the deblocking filter is reached, or until one or more thresholds 224 for a given filter length 218 are not met. Filtering engine 124 then sets filter length 218 for the deblocking filter to the maximum (or minimum) filter length 218 for which all thresholds 224 are met.

For example, filtering engine 124 could use the following comparisons to determine whether or not thresholds 224 associated with filter length 218 values that modify N samples on both sides next to the block boundary (where $N<=3$) are met:

$$d2[i]_j <= \text{thr2 for } i=1 \ldots N-1 \text{ and } i=-2 \ldots N \quad (4)$$

$$d2[0]_j + d2[-1]_j <= \text{thr2} \quad (5)$$

The above comparisons verify that the sum of absolute values of second derivatives 216 for block boundary samples 212 that are adjacent to the block boundary fall within a certain threshold denoted by "thr2," and that individual absolute values of second derivatives 216 for block boundary samples 212 that are one position and two positions away from the block boundary fall within a different threshold denoted by "thr1." When Comparison 5 does not evaluate to true, filtering engine 124 determines that the deblocking filter should not be applied to the corresponding set of block boundary samples 212. When Comparison 5 evaluates to true, filtering engine 124 verifies that a minimum filter length 218 that modifies one block boundary sample on each side of the block boundary should be used and proceeds to evaluate Comparison 4 using absolute values of second derivatives 216 for individual block boundary samples 212 that are one position and two positions away from the boundary. When Comparison 4 evaluates to true for block boundary samples 212 that are one position away from the boundary, filtering engine 124 verifies that a minimum filter length 218 that modifies two block boundary samples 212 on each side of the block boundary should be used. When Comparison 4 also evaluates to true for block boundary samples 212 that are two positions away from the boundary, filtering engine 124 verifies that a minimum filter length 218 that modifies three block boundary samples 212 on each side of the block boundary should be used.

Filtering engine 124 could also use the following comparison to evaluate thresholds 224 associated with a minimum filter length 218 that modifies three block boundary samples 212 on each side of the block boundary:

$$d2[i]_j + d2[-2]_j <= \text{thr2} \quad (6)$$

The above comparison verifies that the sum of absolute values of second derivatives 216 for the two block boundary samples 212 that are one position away from the boundary fall within the threshold denoted by "thr2." In some embodiments, the value of "thr2" can vary based on the value of N (i.e., the number of block boundary samples 212 on each side of the block boundary to be modified by the deblocking filter).

After a minimum filter length 218 associated with N=3 is verified, filtering engine 124 could use the following comparisons to evaluate thresholds 224 for filter length 218 values corresponding to N>=4:

$$d2[i]_j <= \text{thr1 for } i=1,-2 \quad (7)$$

$$d2[0]_j + d2[-1]_j <= \text{thr2} \quad (8)$$

$$\text{sum}(d2[i]_j) <= \text{thr3 for } i=2, \ldots, N-1 \quad (9)$$

$$\text{sum}(d2[i]_j) <= \text{thr3 for } i=-3, \ldots, -N \quad (10)$$

$$\text{abs}((s[0]_j - s[N]_j) - N*(s[0]_j - s[1]_j)) <= \text{thr4} \quad (11)$$

$$\text{abs}((s[-1]_j - s[-N-1]_j) - N*(s[-1]_j - s[-2]_j)) <= \text{thr4} \quad (12)$$

More specifically, filtering engine 124 could evaluate Comparisons 7-12 for each value of N that is greater than or equal to 4, starting with N=4 and incrementing by 1 every time Comparisons 7-12 evaluate to true for a given value of N. Once one or more of Comparisons 7-12 evaluate to false for a given value of N, filtering engine 124 discontinues evaluating thresholds 224 and sets filter length 218 for the deblocking filter to modify N−1 block boundary samples 212 on each side of the block boundary.

Filtering engine 124 could also, or instead, omit Comparisons 9 and 10 and/or replace Comparisons 9 and 10 with the following:

$$d2[i]_j <= \text{thr3 for } i=2, \ldots, N-1 \quad (13)$$

$$d2[i]_j <= \text{thr3 for } i=-3, \ldots, -N \quad (14)$$

In general, filtering engine 124 could omit one or more of the above comparisons 4-14 and/or replace a given comparison with a different type of comparison for a given filter length 218 value.

In one or more embodiments, filtering engine 124 uses Comparisons 7, 9, 10, 12, and 14 to determine the level of detail on each side of the block boundary between two adjacent blocks 202. Comparison 8 can be used to determine a "step" between the two sides of the block boundary and can be replaced by an absolute value of one or both samples $s[0]_j$ and/or $s[-1]_j$ adjacent to the block boundary. Comparisons 11 and 12 can be used to evaluate whether differences between two block boundary samples 212 that are closest to the block boundary and next closest to the block boundary, respectively, follow a longer trend in an increase or decrease in block boundary samples 212 on the corresponding side of the block boundary. Comparisons 11 and 12 can thus be used to avoid filtering artifacts that occur when the "shape" of the signal across the block boundary is not compatible with certain types of deblocking filtering operations.

In one or more embodiments, filtering engine 124 determines thresholds 224 associated with various filter length 218 values based on quantization values 214 associated with the corresponding adjacent blocks 202. More specifically, thresholds denoted by "thr1," "thr3," and "thr4" can be computed based on a "side threshold," and thresholds denoted by "thr2" and "thr5" (discussed in further detail below with respect to a filter parameter 226 associated with the deblocking filter) can be derived from a "q threshold." The side threshold is associated with signal smoothness on a single side of the boundary, and the q threshold is associated with signal smoothness for a signal that spans both sides of the boundary. Both the side threshold and q threshold can depend on quantization values 214 associated with adjacent blocks 202, such as (but not limited to) a quantization step size, quantization index, and/or another indication of the level of quantization applied to a given frame that includes adjacent blocks 202. For example, quantization values 214 could be used as indexes into one or more look-up tables of side thresholds and/or q thresholds used by filtering engine 124. Within the look-up table(s), side threshold and/or q threshold values could be set to be approximately inversely proportional to the quality of the encoded video 206. Thus, higher quality video could be associated with lower thresholds and less deblocking filtering (or no deblocking filtering), and lower quality video could be associated with higher thresholds and more deblocking filtering. Because video quality generally decreases with higher levels of quantization, the side threshold and q threshold could be approximately proportional to quantization values 214 for the corresponding adjacent blocks 202.

When two adjacent blocks 202 are associated with different quantization values 214, the side threshold and/or q threshold for the corresponding block boundary can be determined based on various combinations of these quantization values 214. For example, an index into a look-up table of side threshold and/or q threshold values could be determined based on the quantization value of the current block or the preceding block in a given pair of adjacent blocks 202, the minimum or maximum quantization value associated with the pair of adjacent blocks 202, an average quantization value associated with the pair of adjacent blocks 202, and/or another aggregation of quantization values 214 associated with the pair of adjacent blocks 202.

In one or more embodiments, an encoder that generates the encoded video 206 includes a portion of filtering engine 124 that customizes thresholds 224 for certain portions of encoded video 206. For example, the portion of filtering engine 124 executing within the encoder could specify custom offsets into a look-up table of side thresholds and/or q thresholds so that the corresponding side thresholds and/or q thresholds are used to derive thresholds 224 used in deblocking filtering of a certain frame, sequence of frames 208, segments of a frame, and/or another portion of encoded video 206. The portion of filtering engine 124 executing within the encoder can also store these offsets and/or other attributes that control the deblocking filtering of the portion of encoded video 206 in a set of custom deblocking parameters 222 for that portion of encoded video 206. A different portion of filtering engine 124 executing on a corresponding decoder for the encoded video 206 can read the custom set of deblocking parameters 222 from the encoded video 206 and perform deblocking filtering operations according to the custom set of deblocking parameters 222.

In some embodiments, deblocking parameters 222 are signaled from the encoder of video 206 to the decoder of video 206 in a resource-efficient manner by reusing values associated with deblocking parameters 222 when such reuse of values is beneficial. For example, the encoder could generate deblocking parameters 222 for a given portion of video 206 using the following:

| Deblocking Parameters | Type |
|---|---|
| filter_level[0] | f(1) |
| filter_level[1] | f(1) |
| if (num_planes > 1) { | |
|   if ( filter_level[0] \|\| filter_level[1]) { | |
|     filter_level_u | f(1) |
|     filter_level_v | f(1) |
|   } else { | |
|     filter_level_u = filter_level_v = 0; | |
|   } | |
|   if (filter_level[0]) { | |
|     luma_delta_q | f(1) |
|     if (luma_delta_q) { | |
|       delta_q_luma[0] = delta_q_luma[0] − DF_PAR_OFFSET | f(DF_PAR_BITS) |
|     } else { | |
|       delta_q_luma[0] = 0 | |
|     } | |
|     delta_side_luma[0] = delta_q_luma[0] | |
|   } else { | |
|     delta_q_luma[0] = delta_side_luma[0] = 0 | |
|   } | |
|   if (filter_level[1]) { | |
|     luma_delta | f(1) |
|     if (luma_delta) { | |
|       delta_q_luma[1] = delta_q_luma[1] − DF_PAR_OFFSET | f(DF_PAR_BITS) |
|     } else { | |
|       delta_q_luma[1] = delta_q_luma[0]; | |
|     } | |
|     delta_side_luma[1] = delta_q_luma[1]; | |
|   } else { | |
|     delta_q_luma[1] = delta_side_luma[1] = 0 | |
|   } | |
|   if (filter_level_u) { | |
|     u_delta_q | f(1) |
|     if (u_delta_q) { | |
|       delta_q_u = delta_q_u − DF_PAR_OFFSET; | f(DF_PAR_BITS) |
|     } else { | |
|       delta_q_u = 0; | |
|     } | |
|     delta_side_u = delta_q_u; | |
|   } else { | |
|     delta_q_u = 0 | |
|     delta_side_u = 0 | |
|   } | |
|   if (filter_level_v) { | |
|     v_delta_q | f(1) |
|     if (v_delta_q) { | |
|       delta_q_v = delta_q_v − DF_PAR_OFFSET; | f(DF_PAR_BITS) |
|     } else { | |
|       delta_q_v = 0; | |
|     } | |
|     delta_side_v = delta_q_v; | |
|   } else { | |
|     delta_q_v = delta_side_v = 0; | |
|   } | |
| } | |

In the above table, the "Deblocking Parameters" column includes a sequence of operations that is performed to set various deblocking parameters 222. The "Type" column indicates the number of bits occupied by the corresponding deblocking parameters 222 during signaling of deblocking parameters 222 between the encoder and decoder.

The above table indicates that the encoder begins by setting two one-bit deblocking parameters 222 denoted by filter_level[0] and filter_level[1]. The filter_level[0] parameter corresponds to a flag that indicates whether or not deblocking filtering is to be applied to vertical boundaries of the luma component. The filter_level[1] parameter corresponds to a flag that indicates whether or not deblocking filtering is to be applied to horizontal boundaries of the luma component.

Next, the encoder sets additional deblocking parameters 222 if the number of planes (e.g., color space components) in the video is greater than 1. These additional deblocking parameters 222 include two additional one-bit deblocking parameters 222 denoted by filter_level_u and filter_level_v. The filter_level_u parameter corresponds to a flag that indicates whether or not deblocking filtering is to be applied to the Cb chroma component of the video, and the filter_level_v parameter corresponds to a flag that indicates whether or not deblocking filtering is to be applied to the Cr chroma component of the video. The filter_level_u and filter_level_v parameters can be omitted if filter_level[0] and filter_level[1] indicate that deblocking filtering is not applied to the horizontal or vertical boundaries of the luma component.

If filter_level[0] indicates that deblocking filtering is to be applied to vertical boundaries of the luma component, the encoder adds a one-bit luma_delta_q flag indicating whether or not the q threshold for vertical block boundaries of the luma component is to be customized. If the luma_delta_q flag indicates that the q threshold for the vertical block boundaries of the luma component is customized, the encoder sets a delta_q_luma[0] parameter that represents a custom q threshold for the vertical block boundaries of the luma component. This delta_q_luma[0] has a length of "DF_PAR_BITS" and is set to an offset for the custom q threshold within a look-up table. If the luma_delta_q flag indicates that the luma component is not customized, the encoder omits the delta_q_luma[0] parameter. In both instances, the encoder reuses the delta_q_luma[0] parameter (or lack of delta_q_luma[0] parameter) as the value (or lack of value) of a delta_side_luma[0] parameter that specifies the offset for a side threshold associated with the vertical block boundaries of the luma component. The side threshold can be read from the same look-up table as the q threshold and/or from a different look-up table.

If filter_level[1] indicates that deblocking filtering is to be applied to horizontal boundaries of the luma component, the encoder adds a one-bit luma_delta flag indicating whether or not the q threshold for the horizontal block boundaries of the luma component is to be customized. If the luma_delta flag indicates that the q threshold for the horizontal block boundaries of the luma component is customized, the encoder sets a delta_q_luma[1] parameter that represents a custom q threshold for the horizontal block boundaries of the luma component. This delta_q_luma[1] parameter has a length of "DF_PAR_BITS" and is set to an offset for the custom q threshold within a look-up table. If the luma_delta flag indicates that the q threshold for the horizontal block boundaries of the luma component is not customized, the encoder omits the delta_q_luma[1] parameter. In both instances, the encoder reuses the delta_q_luma[1] parameter (or lack of delta_q_luma[1] parameter) as the value (or lack of value) of a delta_side_luma[1] parameter that specifies the offset for a side threshold index associated with horizontal block boundaries of the luma component. The side threshold can be read from the same look-up table as the q threshold and/or from a different look-up table.

In the above table, "DF_PAR_OFFSET" is used to signal both positive and negative values of a parameter. After "DF_PAR_OFFSET" is subtracted from a received value, the corresponding parameter will have a negative value if the received value is smaller than "DF_PAR_OFFSET" and a positive value if the received value is greater than "DF_PAR_OFFSET."

If filter_level_u indicates that deblocking filtering is to be applied to the Cb chroma component of the video, the encoder adds a one-bit u_delta_q flag indicating whether or not the q threshold for the Cb chroma component is to be customized. If the u_delta_q flag indicates that the q threshold for Cb chroma component is customized, the encoder sets a delta_q_u parameter that represents a custom q threshold for the Cb chroma component. This delta_q_u parameter has a length of "DF_PAR_BITS" and is set to an offset for the custom q threshold within a look-up table. If the u_delta_q flag indicates that the Cb chroma component is not customized, the encoder omits the delta_q_u parameter. In both instances, the encoder reuses the delta_q_u parameter (or lack of delta_q_u parameter) as the value (or lack of value) of a delta_side_u parameter that specifies the offset for a side threshold associated with the Cb chroma component. The side threshold can be read from the same look-up table as the q threshold and/or from a different look-up table.

If filter_level_v indicates that deblocking filtering is to be applied to the Cr chroma component of the video, the encoder adds a one-bit v_delta_q flag indicating whether or not the q threshold for the Cr chroma component is to be customized. If the v_delta_q flag indicates that the q threshold for Cr chroma component is customized, the encoder sets a delta_q_v parameter that represents a custom q threshold for the Cr chroma component. This delta_q_v parameter has a length of "DF_PAR_BITS" and is set to an offset for the custom q threshold within a look-up table. If the v_delta_q flag indicates that the Cr chroma component is not customized, the encoder omits the delta_q_v parameter. In both instances, the encoder reuses the delta_q_v parameter (or lack of delta_q_v parameter) as the value (or lack of value) of a delta_side_v parameter that specifies the offset for a side threshold associated with the Cr chroma component. The side threshold can be read from the same look-up table as the q threshold and/or from a different look-up table.

In some embodiments, the portion of filtering engine 124 executing on the encoder determines deblocking parameters 222 using a search of possible deblocking parameter values. For example, the portion of filtering engine 124 executing on the encoder could use a rate distortion optimization (RDO), minimization, and/or gradient descent technique to analyze different combinations of deblocking parameters 222 for individual frames 208, vertical or horizontal block boundaries within frames 208, and/or block boundaries between specific adjacent blocks 202 in frames 208. The technique could select a set of deblocking parameters 222 that minimizes the following cost function:

$$\text{cost} = \text{frame\_metric\_value} * \text{lambda}(\text{component}) + \text{rate\_parameters} \quad (15)$$

In the above equation, "frame_metric_value" represents a measure of distortion in a given frame, "lambda" represents a Lagrange multiplier for the color component to be optimized using the set of deblocking parameters 222, and "rate_parameters" represents a measure of the amount of data required to encode the video. In the context of selecting and signaling deblocking parameters 222, "frame_metric_value" can correspond to a sum of squared differences (SSD), and "rate_parameters" can correspond to the number of bits occupied by deblocking parameters 222. Thus, "rate_parameters" can be used to bias deblocking parameters 222 toward zero and/or default values that do not occupy additional bits.

After filter length 218 is determined for a given set of block boundary samples 212, filtering engine 124 generates a deblocking filter with the determined filter length 218 using some or all block boundary samples 212. In particular, filtering engine 124 computes a filter parameter 226 using some or all block boundary samples 212 and uses filter parameter 226 to derive filter values 220 that are combined with some or all block boundary samples 212 to perform deblocking filtering of the corresponding boundary. Filtering engine 124 also applies the deblocking filter to adjacent blocks 202 by combining filter values 220 with the corresponding block boundary samples 212.

For example, filtering engine 124 could compute filter parameter 226 as a "delta" parameter using the following:

$$\text{delta} = (3*(s[0]_j - s[-1]_j) - (s[1]_j - s[-2]_j))/2 \quad (16)$$

$$\text{delta} = \text{clamp}(\text{delta}, -\text{thr5}, \text{thr5}) \quad (17)$$

In the above equations, the delta parameter is computed using the difference between two block boundary samples 212 that are immediately adjacent to a given boundary, as well as the difference between two block boundary samples 212 that are one position away from the boundary. The delta parameter can also be clipped based on a threshold denoted by "thr5." As mentioned above, this threshold can be computed using the q threshold associated with adjacent blocks 202. For example, the value of "thr5" could be computed as the q threshold scaled by a value that is indexed by filter length 218 and/or another indication of the number of samples modified by the deblocking filter.

Filtering engine 124 could also use the delta parameter to modify block boundary samples 212 spanned by filter length 218 in the following manner:

$$s'[i]_j = s[i]_j + \text{delta}*(N+i+1)/(2N+1) \text{ for } i=-N,\ldots,-1 \quad (18)$$

Equation 18 can be split into two separate equations for block boundary samples 212 on different sides of the boundary:

$$s'[i]_j = s[i]_j - \text{delta}*(N-1)/(2N+1) \text{ for } i=0,\ldots,N-1 \quad (19)$$

$$s'[-i-1]_j = s[-i-1]_j + \text{delta}*(N-1)/(2N+1) \text{ for } i=0,\ldots,N-1 \quad (20)$$

In the above equations, each block boundary sample $s[i]_j$ affected by the deblocking filter is converted into a modified block boundary sample $s'[i]_j$ by adding a proportion of the delta parameter to the block boundary sample or subtracting a proportion of the delta parameter from the block boundary sample. The proportion of the delta parameter is computed to be highest for block boundary samples that are adjacent to the block boundary and decreases as the distance between a block boundary sample and the block boundary increases. When Equations 16-20 are used to apply the deblocking filter to block boundary samples 212, the second derivative of block boundary samples 212 across the boundary is minimized. The use of deblocking filtering operations to modify block boundary samples is described in further detail below with respect to FIGS. 3A-3B.

An example snippet of code for the proposed deblocking filtering operations (in a divisionless implementation) and with M equal to M includes the following:

```
int deltaM2 = ( 3 * ( s[0] - s[-1*pitch] ) -
    (s[pitch] - s[-2*pitch] ) ) * 4;
  int q_thresh_clamp = q_threshold * q_thresh_mults[width -1 ];
  deltaM2 = clamp(deltaM2, -q_thresh_clamp, q_thresh_clamp );
  deltaM2 *= w_mult[width - 1];
  for (int i = 0; i < width; i++) {
    s[(-i-1)*pitch] = unsigned_char_clamp_high(s[(-i-1) *pitch]
    + ROUND_POWER_OF_TWO(deltaM2 * (width - i), 3 + DF_SHIFT), bd);
    s[i*pitch]=unsigned_char_clamp_high(s[i*pitch]-
    ROUND_POWER_OF_TWO(deltaM2 * (width - i), 3 + DF_SHIFT), bd);
  }
```

In one or more embodiments, filtering engine 124 includes functionality to selectively apply an asymmetric deblocking filter to certain types of block boundary samples 212. This asymmetric deblocking filter modifies different numbers of block boundary samples 212 on each side of the block boundary between two adjacent blocks 202, thereby accommodating differences in signal frequency characteristics and/or content between these adjacent blocks 202. For example, filtering engine 124 could use the asymmetric deblocking filter to modify fewer block boundary samples 212 on one side of the block boundary than on the other side of the boundary when block boundary samples 212 on the one side of the block boundary include high-frequency signals. In another example, filtering engine 124 could apply an asymmetric deblocking filter to block boundary samples 212 from two adjacent blocks 202 of different sizes. The asymmetric deblocking filter could be used to modify a larger number of block boundary samples 212 from the larger block and a smaller number of block boundary samples from the smaller block to reflect the relative sizes of the blocks and/or the relative levels of detail within the blocks.

In some embodiments, filtering engine 124 implements an asymmetric deblocking filter using the following:

$$s'[i]_j = s[i]_j - \text{delta}*(N-i)/(M+N+1) \text{ for } I=0,\ldots,N-1 \quad (19)$$

$$s'[-i-1]_j = s[-i-1]_j + \text{delta}*(M-i)/(M+N+1) \text{ for } I=0,\ldots,M-1 \quad (20)$$

In the above equations, M and N represent the numbers of block boundary samples 212 modified by the deblocking filter on the left (or top) and right (or bottom) sides of the boundary, respectively. When M=N, Equations 19-20 are equivalent to the symmetric deblocking filter described above with respect to Equation 18.

In some embodiments, filtering engine 124 replaces Equations 19 and 20 with the following:

$$s'[i]_j = s[i]_j - \text{delta}*(N-i)/(2N+1) \text{ for } I=0,\ldots,N-1 \quad (21)$$

$$s'[-i-1]_j = s[-i-1]_j + \text{delta}*(M-i)/(2M+N+1) \text{ for } I=0,\ldots,M-1 \quad (20)$$

In the above equations, the proportion of the delta parameter that is added to a given block boundary sample or subtracted from a given block boundary sample is determined based on the number of block boundary samples 212 modified by the deblocking filter on the same side of the boundary. Equations 21-22 can be used to modify block boundary samples 212 in a way that maintains the "midpoint" of block boundary samples 212 across the boundary, while Equations 19-20 can be used to minimize the second derivatives associated with block boundary samples 212.

After one or more deblocking filters are used to modify one or more sets of block boundary samples 212 along a block boundary between two adjacent blocks 202, filtering engine 124 generates two filtered blocks 228 that correspond to the two adjacent blocks 202. These filtered blocks 228 include the modified block boundary samples 212 and additional samples from adjacent blocks 202 that were not modified by the deblocking filter(s).

Filtering engine 124 also generates deblocked frames 230 that include filtered blocks 228. For example, filtering engine 124 could assemble filtered blocks 228 into deblocked frames 230 and provide deblocked frames 230 as output associated with video 206 (e.g., during playback of video 206 and/or for further processing by additional encoder and/or decoder stages).

Figure 3A:
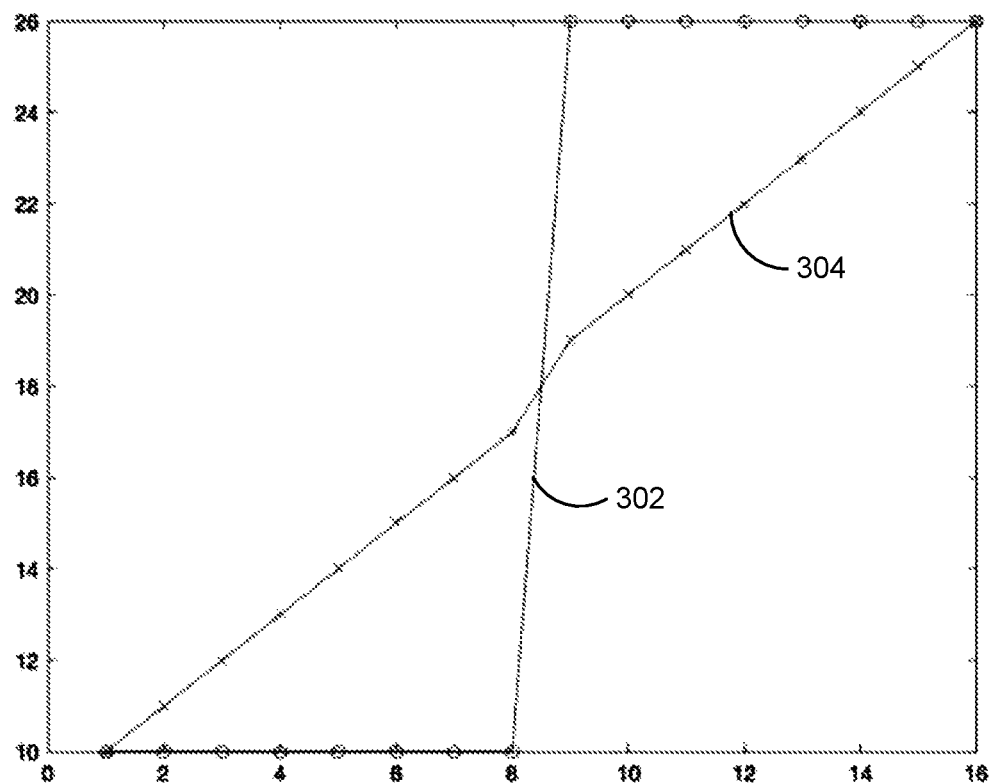
FIG. 3A illustrates an exemplar deblocking filtering operation that modifies a set of samples associated with a boundary between two adjacent blocks within an encoded video frame, according to various embodiments.

FIG. 3A illustrates an exemplar deblocking filtering operation that modifies a set of samples 302 associated with a block boundary between two adjacent blocks within an encoded video frame, according to various embodiments. More specifically, FIG. 3A shows a plot of samples 302 for pixel positions numbered 1 through 16. Pixel positions 1-8 belong to a first block to the left of the block boundary, and pixel positions 9-16 belong to a second block to the right of the block boundary. Samples 302 in pixel positions 1-8 in the first block are set to a low value, while samples 302 in pixel positions 9-16 in the second block are set to a high value. The abrupt change in value from samples 302 to the left of the block boundary to samples 302 to the right of the block boundary can result in a perceptible edge artifact along the block boundary.

As shown in FIG. 3A, a deblocking filter is applied to samples 302 associated with pixel positions 2-15 to generate a new set of samples 304. Unlike samples 302, samples 304 increase linearly from pixel position 1 to pixel position 16, thereby removing the edge artifact caused by the abrupt change in samples 302 across the block boundary. For example, samples 304 could correspond to substantially uniform step sizes between the low value associated with samples 302 in pixel positions 1-8 to the left of the block boundary to the high value associated with samples 302 in pixel positions 9-16 to the right of the block boundary.

Figure 3B:
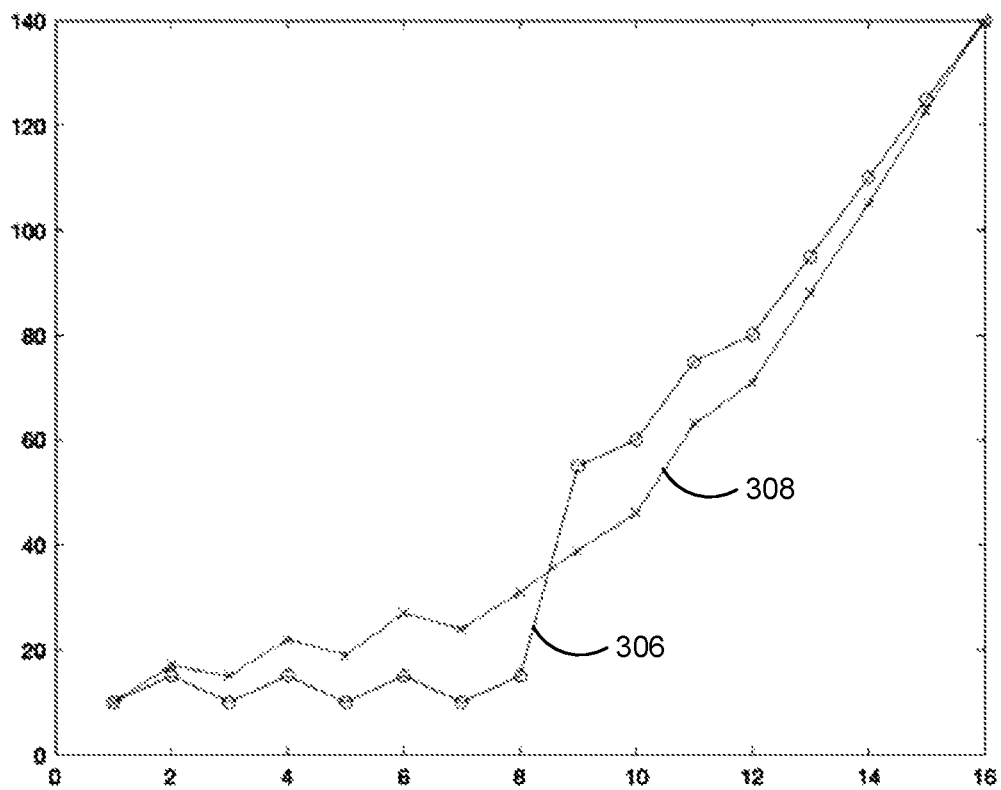
FIG. 3B illustrates an exemplar deblocking filtering operation that modifies a set of samples associated with a boundary between two adjacent blocks within an encoded video frame, according to various embodiments.

FIG. 3B illustrates an exemplar deblocking filtering operation that modifies a set of samples 306 associated with a block boundary between two adjacent blocks within an encoded video frame, according to various embodiments. As with the plot of FIG. 3A, FIG. 3B shows a plot of samples 306 for pixel positions numbered 1 through 16. Pixel positions 1-8 belong to a first block to the left of the block boundary, and pixel positions 9-16 belong to a second block to the right of the block boundary. Samples 306 include an abrupt change in value (and corresponding edge artifact) between pixel positions 8 and 9 and high-frequency detail in other pixel positions 1-7 and 10-16.

As shown in FIG. 3B, a deblocking filter is applied to samples 306 associated with pixel positions 2-15 to generate a new set of samples 308. Samples 308 include a substantially linear increase in value from pixel position 7 to pixel position 10, thereby removing the edge artifact caused by the abrupt change in samples 302 across the block boundary. However, samples 308 also preserve the high-frequency details associated with pixel positions 1-7 and 10-16 in samples 306. Consequently, the deblocking filter avoids the over-smoothing of samples 306 that can occur with conventional low-pass deblocking filters.

Figure 4:
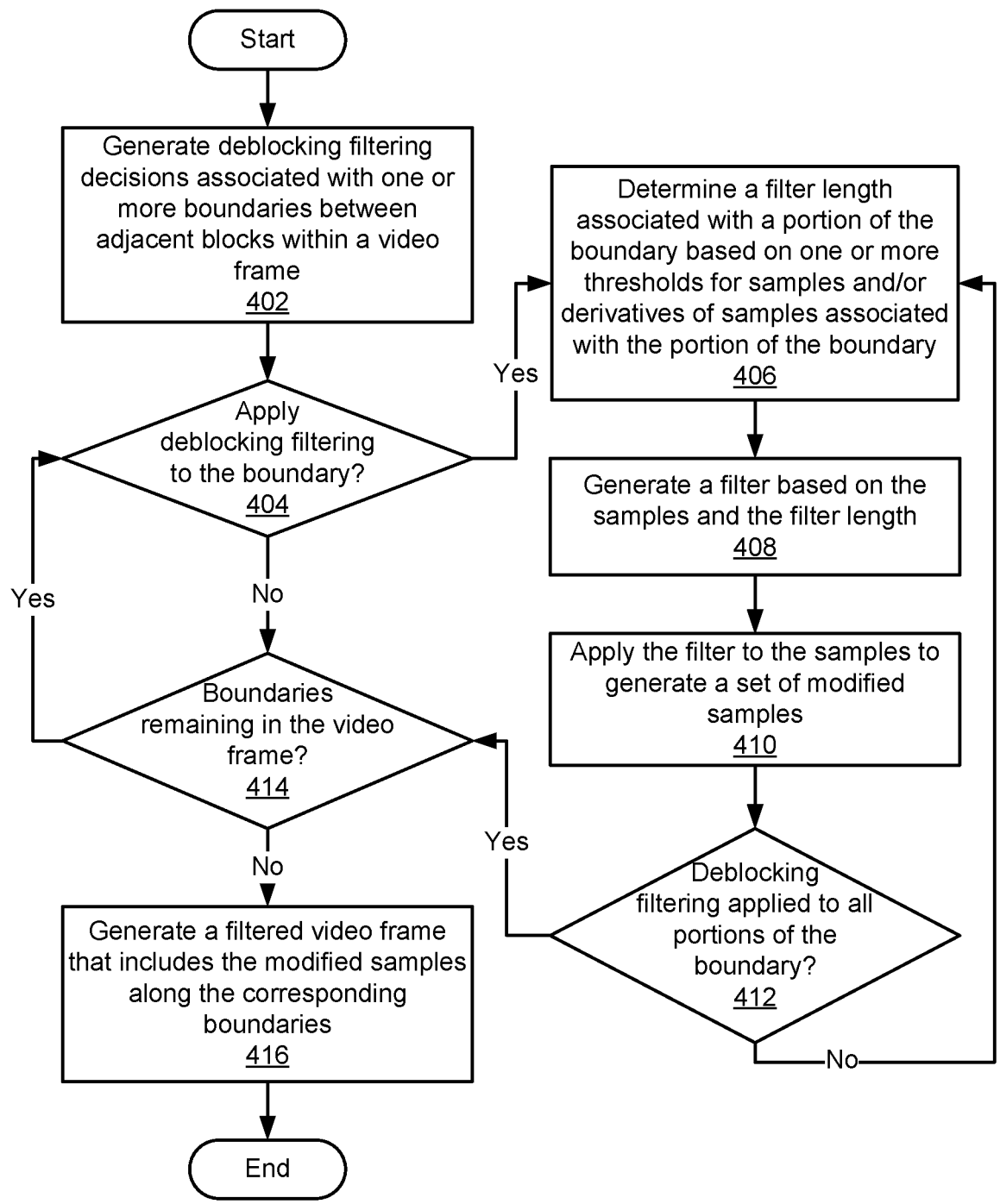
FIG. 4 sets forth a flow diagram of method steps for performing deblocking filtering of a video frame, according to various embodiments.

FIG. 4 sets forth a flow diagram of method steps for performing deblocking filtering of a video frame, according to various embodiments. Although the method steps are described in conjunction with the systems of FIGS. 1-2, persons skilled in the art will understand that any system configured to perform the method steps, in any order, is within the scope of the present invention.

As shown, in step 402, evaluation engine 122 generates deblocking filtering decisions associated with one or more boundaries between adjacent blocks within the video frame. For example, evaluation engine 122 could determine whether or not deblocking filtering is to be applied to various color space components of each boundary based on transform coefficients, quantization parameters, prediction errors, motion vectors, and/or other attributes associated with one or both blocks. Evaluation engine 122 could also store indications of the deblocking filtering decisions in a set of deblocking parameters associated with the blocks and/or video frame.

In step 404, filtering engine 124 determines whether or not to apply deblocking filtering to the boundary. For example, filtering engine 124 could receive deblocking filtering decisions that indicate whether or not deblocking filtering is to be applied to various components of the boundary from evaluation engine 122. Filtering engine 124 could also, or instead, retrieve deblocking parameters that include the deblocking filtering decisions from metadata for the blocks and/or video frame.

In step 406, filtering engine 124 determines a filter length associated with a portion of the boundary based on one or more thresholds for samples and/or derivatives of samples associated with the portion of the boundary. For example, filtering engine 124 could determine the threshold(s) based on the level of quantization associated with one or both blocks, one or more deblocking parameters associated with the boundary, and/or other factors. Filtering engine 124 could use one or more expressions to compare the samples, first derivatives, second derivatives, absolute values of the first derivatives and/or second derivatives, and/or aggregations of the samples, derivatives, or absolute values along the portion of the boundary with the threshold(s). Filtering engine 124 could then determine the filter length as the maximum (or minimum) filter length for which all thresholds are met.

In step 408, filtering engine 124 generates a filter based on the samples and the filter length. For example, filtering engine 124 could compute a filter parameter based on differences between samples on both sides of the boundary. Filtering engine 124 could also compute values of the filter for different pixel positions on each side of the boundary as proportions of the filter parameter that decrease as distances between the pixel positions and the boundary increase.

In step 410, filtering engine 124 applies the filter to the samples to generate a set of modified samples. For example, filtering engine 124 could generate the modified samples by adding the filter values computed in step 408 to the corresponding samples, subtracting the filter values from the corresponding samples, multiplying the samples by the filter values, and/or otherwise combining the filter values and the samples.

In step 412, filtering engine 124 determines whether or not deblocking filtering has been applied to all portions of the boundary. If deblocking filtering has not been applied to all portions of the boundary, filtering engine 124 repeats steps 406-412 for remaining portions (e.g., lines, blocks, etc.) of the boundary.

After deblocking filtering has been applied to all portions of a given boundary, filtering engine 124 performs step 414 to determine whether additional boundaries remain in the video frame. If additional boundaries remain, filtering engine 124 repeats step 404 with each boundary to determine whether or not deblocking filtering is to be applied to the boundary. If deblocking filtering is to be applied to the boundary, filtering engine 124 performs steps 406-412 one or more times to apply deblocking filters to various portions of the boundary. If deblocking filtering is not to be applied to a given boundary, filtering engine 124 omits steps 406-412 for that boundary.

In one or more embodiments, steps 402-414 are performed in a way that independently performs deblocking filtering for different block boundaries and/or different portions of a boundary within a given video frame. For example, multiple instances of evaluation engine 122 and/or filtering engine 124 could perform steps 402-414 in parallel to perform deblocking filtering of multiple boundaries and/or multiple portions of a given boundary at the same time.

After all boundaries in the video frame have been processed using steps 404-414, filtering engine 124 performs step 416, in which filtering engine 124 generates a filtered video frame that includes the modified samples along the corresponding boundaries. For example, filtering engine 124 could generate filtered versions of blocks within the video frame by replacing samples along block boundaries to which deblocking filtering has been applied with the corresponding modified samples generated in step 410. Filtering engine 124 could also arrange the filtered versions of the blocks into a filtered version of the video frame. Filtering engine 124 could then output the filtered version of the video frame during playback of a video that includes the video frame and/or for further processing by downstream components of an encoder or decoder associated with the video frame.

In sum, the disclosed techniques use a generalized deblocking filter to remove sharp edges and other artifacts along block boundaries between adjacent blocks within an encoded video frame. The generalized deblocking filter uses a small number of functions to perform deblocking filtering for any combination of filter length, color space component, or another type of deblocking filtering condition that affects the manner in which deblocking filtering operations are performed.

The filter length corresponds to the number of samples that can be modified by a deblocking filter. This filter length is computed for a given block or line of pixels that crosses a block boundary between two adjacent blocks by evaluating various conditions associated with different filter lengths, starting from a lowest (or highest) filter length and progressing to increasingly higher (or lower) filter lengths. Each condition specifies a threshold associated with a set of "samples" (e.g., chroma, luma, or other pixel values) from positions on both sides of the boundary and/or a set of derivatives (e.g., first derivatives, second derivatives, etc.) computed from the samples. When a set of conditions associated with a given filter length is met by the corresponding samples or derivatives, the process is repeated using another set of conditions associated with the next highest (or lowest) filter length. Thus, the filter length can be determined as the highest (or lowest) filter length for which all conditions are met, up to a maximum (or minimum) filter length associated with the generalized deblocking filter.

After the filter length is determined for a block or line of pixels that crosses a given block boundary, samples from both sides of the block boundary are used to derive a "delta" parameter value that minimizes the sum of squares of second derivatives of the samples adjacent to the block boundary. The deblocking filter is then applied as different proportions of the delta parameter to different sample positions spanned by the filter length, with the proportion of the delta parameter applied to a given sample position computed to be inversely proportional to the distance between the sample position and the block boundary. Because the deblocking filter minimizes the sum of squares of second derivatives of the samples, the deblocking filter is able to smooth the sample values across the block boundary.

One technical advantage of the disclosed techniques relative to the prior art is that, with the disclosed techniques, edge artifacts along the boundaries between adjacent blocks within an encoded video frame can be removed in a way that preserves relevant high-frequency details near those boundaries. Consequently, the disclosed techniques can improve the visual quality of decompressed videos relative to what can be achieved using conventional filtering approaches that are unable to remove noticeable edge artifacts around block boundaries or that tend to over-smooth and remove relevant high-frequency details from video content near block boundaries. Another technical advantage of the disclosed techniques is the use of a small number of functions to compute the deblocking filters associated with various combinations of filter lengths, color space components, or other deblocking filtering conditions. Accordingly, the disclosed techniques are more resource-efficient than existing codecs that use dozens of functions to implement deblocking filters for the different combinations of deblocking filtering conditions. These technical advantages provide one or more technological improvements over prior art approaches.

1. In some embodiments, a computer-implemented method for deblocking video frames comprises determining a filter length associated with a boundary between a first block included in a first video frame and a second block included in the first video frame; computing a parameter value that minimizes a sum of squares of second derivatives associated with a first set of samples within the first block and a second set of samples within the second block, wherein the first set of samples and second set of samples are adjacent to the boundary; determining a plurality of filter values based on the parameter value and the filter length; applying a filter having the filter length and the plurality of filter values to a third set of samples within the first block and a fourth set of samples within the second block to generate a first filtered block corresponding to the first block and a second filtered block corresponding to the second block; and generating a second video frame that includes the first filtered block and the second filtered block.

2. The computer-implemented method of clause 1, wherein the parameter value is computed based on at least one difference between the first set of samples and the second set of samples.

3. The computer-implemented method of any of clauses 1-2, wherein each filter value included in the plurality of filter values is determined based a sample position of a corresponding sample included in at least one of the third set of samples or the fourth set of samples.

4. The computer-implemented method of any of clauses 1-3, wherein determining the filter length comprises determining that a first condition associated with a first filter length is met; and in response to determining that the first condition is met, determining whether a second condition associated with a second filter length is met.

5. The computer-implemented method of any of clauses 1-4, wherein the second filter length is greater than the first filter length.

6. The computer-implemented method of any of clauses 1-5, wherein determining the filter length comprises at least one of comparing a derivative associated with the third set of samples or the fourth set of samples to a first threshold; or comparing an aggregation of a plurality of derivatives associated with the third set of samples or the fourth set of samples to a second threshold.

7. The computer-implemented method of any of clauses 1-6, wherein determining the filter length comprises determining one or more thresholds associated with either the third set of samples or the fourth set of samples based on a level of quantization associated with either the first block or the second block.

8. The computer-implemented method of any of clauses 1-7, wherein the filter length is determined for at least one of a line of pixels that crosses the boundary or a block of pixels that crosses the boundary.

9. The computer-implemented method of any of clauses 1-8, wherein the filter length is determined based on a threshold associated with at least one of the third set of samples, the fourth set of samples, a set of second derivatives associated with the third set of samples, or a set of second derivatives associated with the fourth set of samples.

10. The computer-implemented method of any of clauses 1-9, wherein the filter length is determined based on a threshold for an absolute value of a second derivative associated with either the third set of samples or the fourth set of samples.

11. In some embodiments, one or more non-transitory computer-readable media store instructions that, when executed by one or more processors, cause the one or more processors to perform the steps of determining a filter length associated with a boundary between a first block included in a first video frame and a second block included in the first video frame; computing a parameter value that minimizes a sum of squares of second derivatives associated with a first set of samples within the first block and a second set of samples within the second block, wherein the first set of samples and second set of samples are adjacent to the boundary; determining a plurality of filter values based on the parameter value and the filter length; applying a filter having the filter length and the plurality of filter values to a third set of samples within the first block and a fourth set of samples within the second block to generate a first filtered block corresponding to the first block and a second filtered block corresponding to the second block; and generating a second video frame that includes the first filtered block and the second filtered block.

12. The one or more non-transitory computer-readable media of clause 11, wherein determining the plurality of filter values comprises for each sample position within the first block or the second block that is associated with the filter length, computing a corresponding filter value based on the parameter value and a distance between the sample position and the boundary.

13. The one or more non-transitory computer-readable media of any of clauses 11-12, wherein the corresponding filter value is computed to be inversely proportional to the distance between the sample position and the boundary.

14. The one or more non-transitory computer-readable media of any of clauses 11-13, wherein applying the filter to the third set of samples and the fourth set of samples comprises applying a first set of filter values included in the plurality of filter values to the first set of samples; and applying a second set of filter values included in the plurality of filter values to the second set of samples.

15. The one or more non-transitory computer-readable media of any of clauses 11-14, wherein the first set of filter values is larger than the second set of filter values.

16. The one or more non-transitory computer-readable media of any of clauses 11-15, wherein applying the filter to the third set of samples and the fourth set of samples comprises adding a filter value that is included in the plurality of filter values to a corresponding sample included in the third set of samples or the fourth set of samples.

17. The one or more non-transitory computer-readable media of any of clauses 11-16, wherein determining the filter length comprises determining one or more thresholds associated with the filter length based on one or more deblocking parameters associated with the boundary.

18. The one or more non-transitory computer-readable media of any of clauses 11-17, wherein the one or more deblocking parameters comprise at least one of an offset associated with the one or more thresholds, a level of quantization associated with the first block or the second block, or a color space component to which the filter is to be applied.

19. The one or more non-transitory computer-readable media of any of clauses 11-18, wherein one or more of the first set of samples or the second set of samples comprises at least one of a luma value or a chroma value.

20. In some embodiments, a system comprises one or more memories that store instructions, and one or more processors that are coupled to the one or more memories and, when executing the instructions, are configured to perform the steps of determining a filter length associated with a boundary between a first block included in a first video frame and a second block included in the first video frame; computing a parameter value that minimizes a sum of squares of second derivatives associated with a first set of samples within the first block and a second set of samples within the second block, wherein the first set of samples and second set of samples are adjacent to the boundary; determining a plurality of filter values based on the parameter value and the filter length; applying a filter having the filter length and the plurality of filter values to a third set of samples within the first block and a fourth set of samples within the second block to generate a first filtered block corresponding to the first block and a second filtered block corresponding to the second block; and generating a second video frame that includes the first filtered block and the second filtered block.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for deblocking video frames, the method comprising:
   determining a filter length associated with a boundary between a first block included in a first video frame and a second block included in the first video frame;
   computing a parameter value that minimizes a sum of squares of second derivatives associated with a first set of samples within the first block and a second set of samples within the second block, wherein the first set of samples and second set of samples are adjacent to the boundary;
   determining a plurality of filter values based on the parameter value and the filter length;
   applying a filter having the filter length and the plurality of filter values to a third set of samples within the first block and a fourth set of samples within the second block to generate a first filtered block corresponding to the first block and a second filtered block corresponding to the second block; and
   generating a second video frame that includes the first filtered block and the second filtered block.

2. The computer-implemented method of claim 1, wherein the parameter value is computed based on at least one difference between the first set of samples and the second set of samples.

3. The computer-implemented method of claim 1, wherein each filter value included in the plurality of filter values is determined based a sample position of a corresponding sample included in at least one of the third set of samples or the fourth set of samples.

4. The computer-implemented method of claim 1, wherein determining the filter length comprises:
   determining that a first condition associated with a first filter length is met; and
   in response to determining that the first condition is met, determining whether a second condition associated with a second filter length is met.

5. The computer-implemented method of claim 4, wherein the second filter length is greater than the first filter length.

6. The computer-implemented method of claim 1, wherein determining the filter length comprises at least one of:
   comparing a derivative associated with the third set of samples or the fourth set of samples to a first threshold; or
   comparing an aggregation of a plurality of derivatives associated with the third set of samples or the fourth set of samples to a second threshold.

7. The computer-implemented method of claim 1, wherein determining the filter length comprises determining one or more thresholds associated with either the third set of samples or the fourth set of samples based on a level of quantization associated with either the first block or the second block.

8. The computer-implemented method of claim 1, wherein the filter length is determined for at least one of a line of pixels that crosses the boundary or a block of pixels that crosses the boundary.

9. The computer-implemented method of claim 1, wherein the filter length is determined based on a threshold associated with at least one of the third set of samples, the fourth set of samples, a set of second derivatives associated with the third set of samples, or a set of second derivatives associated with the fourth set of samples.

10. The computer-implemented method of claim 1, wherein the filter length is determined based on a threshold for an absolute value of a second derivative associated with either the third set of samples or the fourth set of samples.

11. One or more non-transitory computer-readable media storing instructions that, when executed by one or more processors, cause the one or more processors to perform the steps of:
   determining a filter length associated with a boundary between a first block included in a first video frame and a second block included in the first video frame;
   computing a parameter value that minimizes a sum of squares of second derivatives associated with a first set of samples within the first block and a second set of samples within the second block, wherein the first set of samples and second set of samples are adjacent to the boundary;
   determining a plurality of filter values based on the parameter value and the filter length;
   applying a filter having the filter length and the plurality of filter values to a third set of samples within the first block and a fourth set of samples within the second block to generate a first filtered block corresponding to the first block and a second filtered block corresponding to the second block; and generating a second video frame that includes the first filtered block and the second filtered block.

12. The one or more non-transitory computer-readable media of claim 11, wherein determining the plurality of filter values comprises for each sample position within the first block or the second block that is associated with the filter length, computing a corresponding filter value based on the parameter value and a distance between the sample position and the boundary.

13. The one or more non-transitory computer-readable media of claim 12, wherein the corresponding filter value is computed to be inversely proportional to the distance between the sample position and the boundary.

14. The one or more non-transitory computer-readable media of claim 11, wherein applying the filter to the third set of samples and the fourth set of samples comprises:

applying a first set of filter values included in the plurality of filter values to the first set of samples; and applying a second set of filter values included in the plurality of filter values to the second set of samples.

15. The one or more non-transitory computer-readable media of claim 14, wherein the first set of filter values is larger than the second set of filter values.

16. The one or more non-transitory computer-readable media of claim 11, wherein applying the filter to the third set of samples and the fourth set of samples comprises adding a filter value that is included in the plurality of filter values to a corresponding sample included in the third set of samples or the fourth set of samples.

17. The one or more non-transitory computer-readable media of claim 11, wherein determining the filter length comprises determining one or more thresholds associated with the filter length based on one or more deblocking parameters associated with the boundary.

18. The one or more non-transitory computer-readable media of claim 17, wherein the one or more deblocking parameters comprise at least one of an offset associated with the one or more thresholds, a level of quantization associated with the first block or the second block, or a color space component to which the filter is to be applied.

19. The one or more non-transitory computer-readable media of claim 11, wherein one or more of the first set of samples or the second set of samples comprises at least one of a luma value or a chroma value.

20. A system, comprising:

one or more memories that store instructions, and one or more processors that are coupled to the one or more memories and, when executing the instructions, are configured to perform the steps of:

determining a filter length associated with a boundary between a first block included in a first video frame and a second block included in the first video frame;

computing a parameter value that minimizes a sum of squares of second derivatives associated with a first set of samples within the first block and a second set of samples within the second block, wherein the first set of samples and second set of samples are adjacent to the boundary;

determining a plurality of filter values based on the parameter value and the filter length;

applying a filter having the filter length and the plurality of filter values to a third set of samples within the first block and a fourth set of samples within the second block to generate a first filtered block corresponding to the first block and a second filtered block corresponding to the second block; and generating a second video frame that includes the first filtered block and the second filtered block.

* * * * *